F. STRATTNER.
Fire-Brick for Furnaces.

No. 164,494. Patented June 15, 1875.

WITNESSES:
P. C. Dieterich
W. C. McArthur

INVENTOR:
F. Strattner
per
C. H. Watson & Co
ATTORNEYS.

UNITED STATES PATENT OFFICE.

FREDERICK STRATTNER, OF WILMINGTON, DELAWARE.

IMPROVEMENT IN FIRE-BRICKS FOR FURNACES.

Specification forming part of Letters Patent No. 164,494, dated June 15, 1875; application filed December 10, 1874.

*To all whom it may concern:*

Be it known that I, FREDERICK STRATTNER, of Wilmington, in the county of New Castle and State of Delaware, have invented certain new and useful Improvements in Fire-Brick for Furnaces; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in the construction and arrangement of a fire-brick for locomotive and other furnaces, as will be hereinafter more fully set forth.

Figure 1:
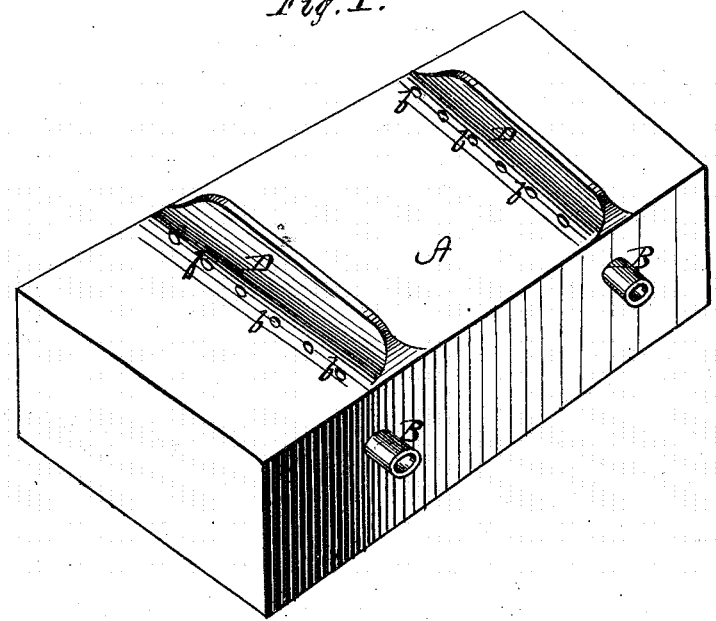
Figure 2:
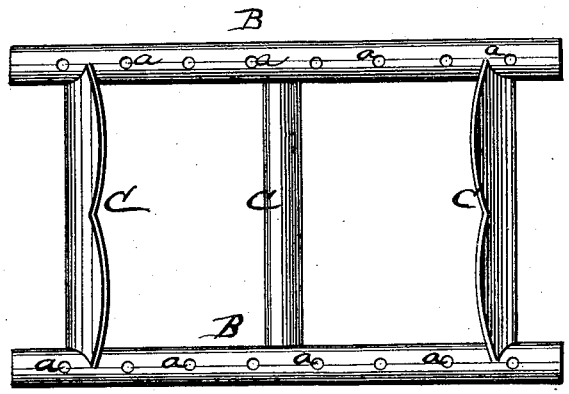

In the accompanying drawing, Figure 1 is a perspective view of a fire-brick embodying my invention. Fig. 2 is a plan view of a metallic frame molded in the brick.

A represents a fire-brick provided with my improvements. In the molding or manufacturing of this brick, a metallic frame is molded into the brick, said frame consisting of two hollow tubes, B B, placed transversely in the brick, and connected by means of cross-bars C C, which may be hollow or otherwise, as desired, by which means the brick is made stronger and more durable. The ends of the tubes B B project beyond the sides of the brick, and they have each a series of perforations, $a$ $a$, as shown in Fig. 2. In the brick A are made channels or passages $b$ $b$, corresponding with the perforations $a$ $a$ in the tubes B B.

The object of the hollow perforated tubes and the channels in the brick is to cause air to be drawn through the same either by the natural draft or by artificial means, which air becomes heated within the brick, and is admitted over the surface of the fire, to increase combustion and consume the smoke.

In locomotives, where the exhaust-steam may be used to create draft through the brick, the inner side of the brick is, along the rows of openings to the channels $b$, provided with ledges or projections D D for the exhaust-steam as it escapes from the cylinder to strike against, and thereby draw in air, as the brick are set parallel with the flues.

The metallic frame B C may be omitted, and the brick made hollow, with channels for the passage of the air, which may be supplied from the front, sides, bottom, or back of the furnace. In a locomotive it will require holes through the furnace to communicate with the holes in the brick. The air passing through the brick keeps them cooler and renders them more serviceable.

The brick may be made in two halves—top and bottom—which, by being placed together, forms a complete brick.

Having thus fully described my invention, what I claim as new, and desire to secure by Letters Patent, is—

1. A fire-brick, in combination with a perforated metallic frame incased within said brick, and having channels or passages corresponding with the perforations in the frame, substantially as and for the purpose specified.

2. The combination of the fire-brick A, having ledges D D and channels or passages $b$ $b$, and the hollow metallic frame B C, provided with perforations $a$ $a$, all substantially as and for the purposes herein set forth.

In testimony that I claim the foregoing as my own I affix my signature in presence of two witnesses.

FREDK. STRATTNER.

Witnesses:
C. H. WATSON,
H. A. HALL.